(12) United States Patent
Sugimoto (10) Patent No.: US 8,091,417 B2
(45) Date of Patent: Jan. 10, 2012

(54) METHOD FOR DETERMINING AMOUNT OF CORRECTION OF BEARING HEIGHT

(75) Inventor: Iwao Sugimoto, Osaka (JP)

(73) Assignee: Hitachi Zosen Corporation (JP)

( * ) Notice: Subject to any disclaimer, the term of this patent is extended or adjusted under 35 U.S.C. 154(b) by 246 days.

(21) Appl. No.: 12/451,834

(22) PCT Filed: May 28, 2008

(86) PCT No.: PCT/JP2008/001322
§ 371 (c)(1),
(2), (4) Date: Dec. 2, 2009

(87) PCT Pub. No.: WO2009/001506
PCT Pub. Date: Dec. 31, 2008

(65) Prior Publication Data
US 2010/0138050 A1    Jun. 3, 2010

(30) Foreign Application Priority Data
Jun. 25, 2007    (JP) ................. 2007-165723

(51) Int. Cl.
*G01M 15/04*    (2006.01)
(52) U.S. Cl. ................................................. 73/114.81
(58) Field of Classification Search ............... 73/114.77, 73/114.79, 115.01, 114.81
See application file for complete search history.

(56) References Cited

U.S. PATENT DOCUMENTS

| 4,610,095 A | * | 9/1986 | Tannery | 33/517 |
| 2009/0271053 A1 | * | 10/2009 | Sugimoto | 701/21 |

FOREIGN PATENT DOCUMENTS

| JP | 64-087922 | 4/1989 |
| JP | 08-091283 | 4/1996 |
| JP | 2000-088709 | 3/2000 |
| JP | 2003-019997 | 1/2003 |

* cited by examiner

*Primary Examiner* — Eric S McCall
(74) *Attorney, Agent, or Firm* — Kusner & Jaffe (57) ABSTRACT

A method for determining an amount of correction of a bearing height includes the steps of: determining the heights of bearings in an engine by using a transfer matrix method based on an actually measured bearing load and an actually measured crank deflection; determining a computed bearing load acting on each of the bearings based on the determined bearing height; determining a reference bearing load acting on each bearing when the bearing height of each bearing is positioned on a reference plane; determining a load difference between the computed bearing load and the reference bearing load on each bearing; and comparing the determined load difference with a set range and, when the determined load difference exceeds the set range, determining a correction range of the bearing height such that the load difference falls within an allowable range.

3 Claims, 6 Drawing Sheets

METHOD FOR DETERMINING AMOUNT OF CORRECTION OF BEARING HEIGHT

TECHNICAL FIELD

The present invention relates to a method for determining an amount of correction for the bearing height of a crankshaft of an engine installed in, for example, a ship.

BACKGROUND ART

When installing an engine that is a main engine and a propeller shaft in a ship, it is necessary to accurately align shaft-center positions of drive shafting made up of a crankshaft, an intermediate shaft and a propeller shaft of the engine or, in other words, to accurately perform shafting alignment.

As a method capable of accurately performing such shafting alignment, the present inventors have proposed a method for detecting the position of drive shafting by using a transfer matrix method (refer to Japanese Patent Laid-Open No. 2003-19997).

The aforementioned position detecting method will now be briefly described.

First, a crankshaft is modeled and respective bearing positions are assumed. The state quantity (displacement and acting force) of the fore bearing of the crankshaft is transferred to an aft-side using a field transfer matrix and a point transfer matrix made known according to the specification data of an engine, a boundary matrix that is a boundary condition on a fore side, and a boundary matrix of an aft side. The state quantity of the fore bearing which is an unknown is calculated, whereby the result thereof is then used to calculate a crank deflection, and an error (evaluated value) is calculated through a comparison between the calculated value and the actual measured value of the crank deflection. Next, while randomly varying the respective assumed bearing positions, the same calculations as described above are performed to repeatedly calculate errors between the calculated values and the actual measured values of crank deflections in the respective bearing positional conditions in order to determine a bearing positional condition in which the error is reduced (i.e., evaluation is improved). Accordingly, an installation position is accurately estimated.

DISCLOSURE OF THE INVENTION

According to the aforementioned method for detecting the position of drive shafting, while the current installation position of a bearing can be accurately estimated, determining to what extent the bearing height should be actually corrected based on the estimated bearing height remains to be solved.

In consideration thereof, an object of the present invention is to provide a method for determining an amount of correction of a bearing height regardless of whether a ship is already in service or newly built.

In order to solve the aforementioned problem, a first aspect of the present invention is a method for determining at least an amount of correction of a bearing height of a crankshaft in an engine connected to driven shafting, the method including: a bearing height computing step of determining at least the heights of bearings of the engine by using a transfer matrix method based on an actually measured bearing load on the bearing at a predetermined position and an actually measured crank deflection; a bearing load computing step of determining at least a computed bearing load acting on each of the bearings of the engine based on the bearing height determined in the bearing height computing step; a reference bearing load computing step of determining a reference bearing load acting on each bearing when the bearing height of each bearing of the engine is positioned on a reference plane; a load difference computing step of determining a load difference between the computed bearing load and the reference bearing load on each bearing; and an amount-of-correction determining step of comparing the load difference determined in the load difference computing step with a set range and, when the determined load difference exceeds the set range, determining a correction range of the bearing height such that the load difference falls within an allowable range.

According to a second aspect of the present invention, in the method for determining an amount of correction of a bearing height according to the first aspect, the set range is set to −40 to +40 percent of an average value of loads on the bearings of the engine.

According to a third aspect of the present invention, in the method for determining an amount of correction of a bearing height according to the first aspect, the allowable range is set to −20 to +20 percent of an average value of loads on the bearings of the engine.

The method of determining an amount of correction is arranged so that after determining heights of bearings along the entire shafting based on an actually measured crank deflection and an actually measured bearing load on a predetermined bearing, at least a bearing load on a bearing disposed on an engine is determined by computation based on the bearing height, a load difference between the computed bearing load and a reference bearing load positioned on a reference plane or, in other words, a reference bearing load in an initially set state is determined, and when the load difference exceeds a preset set range, a correction range of the bearing height is determined such that the load difference after changing the bearing height falls within a preset allowable range. Thus with respect to an engine installed in, for example, a ship, an amount of correction of a bearing height can now be determined in an accurate and speedy manner regardless of whether the ship is newly built or already in service.

BEST MODE FOR CARRYING OUT THE INVENTION

Hereinafter, a method of determining an amount of correction of a bearing height according to a preferred embodiment of the present invention will be described with reference to FIGS. 1 to 9.

In the description, bearings according to the present embodiment support a crankshaft of, for example, a ship diesel engine (also referred to as a main engine) to be mounted on a ship.

First, a configuration of the engine will be schematically described.

Figure 1:
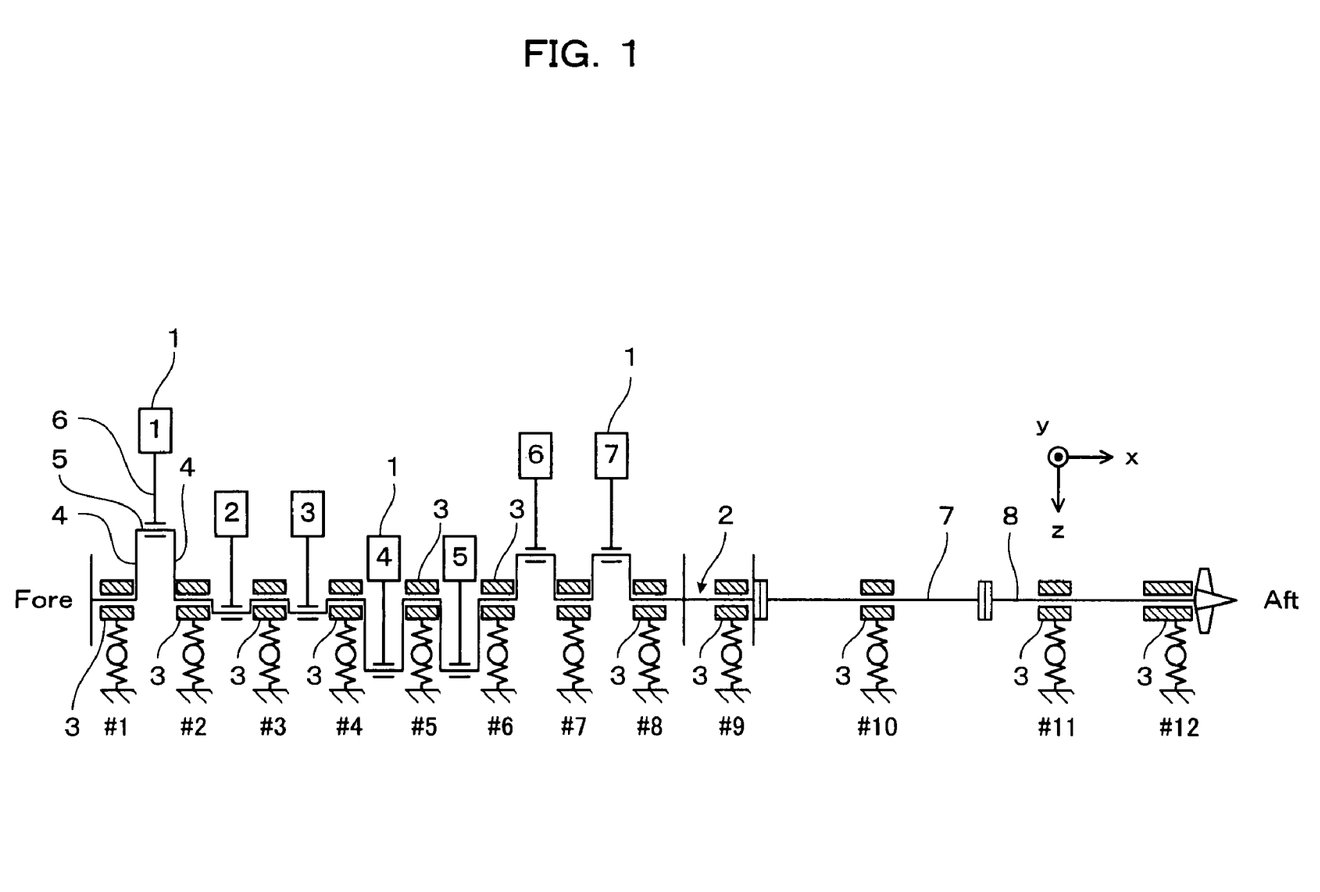
FIG. 1 is a schematic configuration diagram of drive shafting in a ship to which is applied a method of determining an amount of correction for a bearing height according to an embodiment of the present invention.

As shown in FIG. 1, the engine includes, for example, seven pistons 1. A crankshaft 2 to which the pistons 1 are coupled is supported by eight (#1 to #8) bearings 3 as well as a #9 bearing 3 provided on a wall portion of an aft engine case. Moreover, #1 denotes a fore bearing while #8 denotes an aft bearing. As a matter of course, at a position corresponding to each piston 1 of the crankshaft 2, a crankpin 5 is provided via a crank arm 4 and the crankpin 5 and the piston 1 are connected to each other via a connecting rod 6.

Propulsion shafting (an example of driven shafting) made up of an intermediate shaft 7 and a propeller shaft (also referred to as an aft-tube) 8 is disposed at a rear-end portion of the crankshaft 2. In addition, a #10 bearing 3 that supports the intermediate shaft 7 and two bearings, namely, a #11 bearing 3 and a #12 bearing 3 support front and rear portions of the propeller shaft 8 are provided at the rear-end portion of the crankshaft 2. As a matter of course, a front-end portion of the intermediate shaft 7 is connected to the rear-end portion of the crankshaft 2.

Hereinafter, a method for determining an amount of correction of the height of each bearing 3, in particular, the height of each bearing 3 provided at the engine or, in other words, a bearing height will be schematically described step by step. Subsequently, the contents described step by step will be described, albeit partially, in greater detail.

The method for determining an amount of correction includes: a bearing height computing step of determining at least a height of each bearing of an engine by using a transfer matrix method based on an actually measured bearing load on a bearing at a predetermined position and an actually measured crank deflection; a bearing load computing step of determining at least a computed bearing load acting on each bearing of the engine based on the bearing height determined in the bearing height computing step; a reference bearing load computing step of determining a reference bearing load acting on each bearing when the bearing height of each bearing of the engine is positioned on a reference plane; a load difference computing step of determining a load difference between the computed bearing load on each bearing and the reference bearing load, thereon; and an amount-of-correction determining step of comparing the load difference determined in the load difference computing step with a set range and, when the determined load difference exceeds the set range, determining a correction range of the bearing height such that the load difference falls within an allowable range.

A height of each bearing 3 is determined in the bearing height computing step. When determining the bearing height, an actually measured crank deflection and an actually measured bearing load are used. However, bearing loads can be actually measured only from, for example, the #7 to #10 bearings.

The computation for determining a bearing height involves determining a state quantity (displacement and acting force) at a predetermined position in drive shafting made up of the crankshaft 2, the intermediate shaft 7, and the propeller shaft 8 using a transfer matrix method. While details of the computation for determining a bearing height are disclosed in the aforementioned Japanese Patent Laid-Open No. 2003-19997, a brief description thereof will be given below.

The method for computing a bearing height involves: determining a state quantity across the entire drive shafting using a temporary installation height and determining from the state quantity, through computation, a crank deflection and a bearing load at the propulsion shafting made up of the intermediate shaft 7 and the propeller shaft 8; performing evaluations on the determined computed deflection value and the computed bearing load value using the actually measured crank deflection and the actually measured bearing load (in other words, determining an evaluation value by substituting the computed deflection value, the computed bearing load value, the actually measured crank deflection, and the actually measured bearing load into an evaluation formula prepared in advance); and estimating a temporary installation height at which the evaluation value falls within a preset set range (also referred to as an allowable range) as an actual bearing height.

In other words, bearing heights can be determined approximately accurately across the entire drive shafting based on a crank deflection and a bearing load which can be actually measured. As for the bearing heights, both an initial bearing height before setting the crankshaft and a bearing height after setting the crankshaft and load balance is achieved are determined. The transfer matrix method disclosed in Japanese Patent Laid-Open No. 2003-19997 will be described later in somewhat greater detail.

Figure 2:
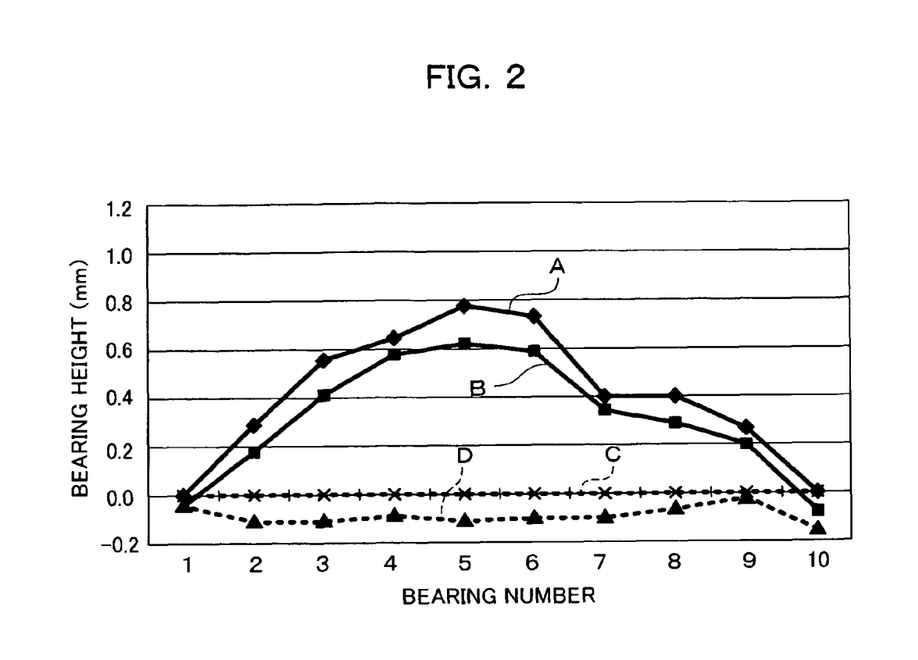
FIG. 2 is a graph showing bearing heights for explaining the method of determining an amount of correction according to the embodiment of the present invention.

Next, a bearing load is determined by computation based on the bearing height determined in the bearing height computing step (in FIG. 2, an initial bearing height is indicated by a solid line A while a bearing height after balance is indicated by a solid line B). In other words, in the bearing load computing step, a bearing load is determined by multiplying a bearing height displacement (a difference between the initial bearing height before the crankshaft is set and the bearing height after the crankshaft is set and load balance is achieved) by a spring constant at a bearing portion.

Subsequently, in the reference bearing load computing step, by the same procedure as described earlier, a reference bearing load is determined based on the displacement of each bearing height in a state where each bearing is set on a horizontal plane [in FIG. 2, a dashed line C indicates an initial bearing height (with a height of zero) while a dashed line D indicates a bearing height after balance is achieved].

Figure 3:
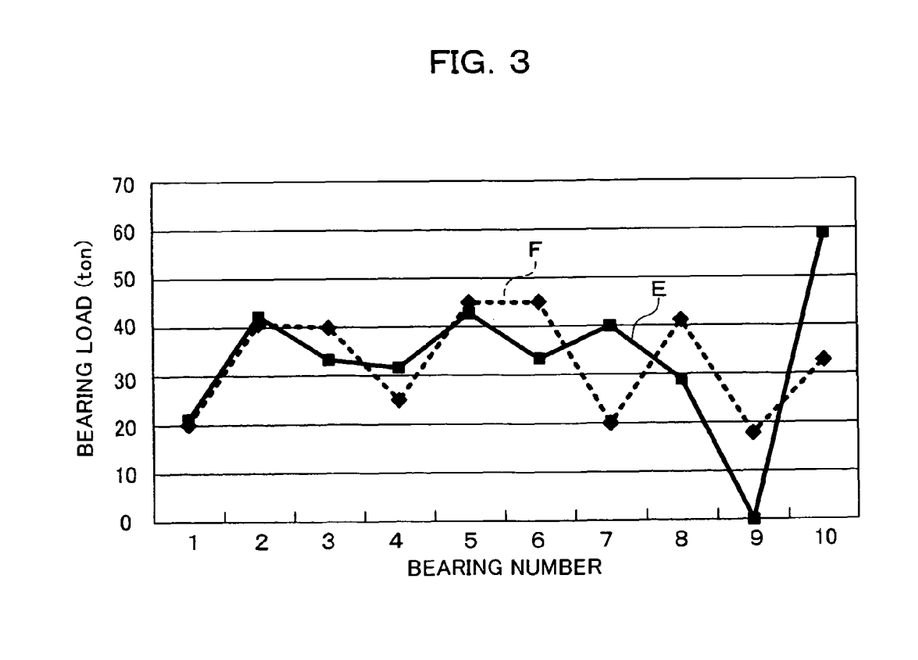
FIG. 3 is a graph showing bearing loads for explaining the method of determining an amount of correction according to the embodiment of the present invention.

For example, FIG. 3 is a graphic representation of a current computed bearing load and a reference bearing load at each bearing 3. In FIG. 3, a solid line E indicates a computed bearing load while a dashed line F indicates a reference bearing load.

Figure 4:
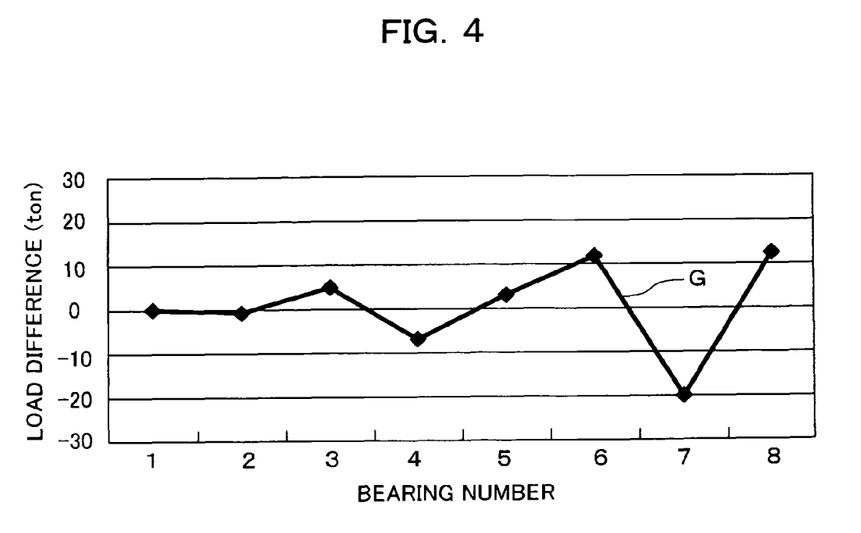
FIG. 4 is a graph showing load differences of bearings for explaining the method of determining an amount of correction according to the embodiment of the present invention.

Next, in the load difference computing step, a load difference that is a difference between a computed bearing load and a reference bearing load is determined. A solid line G in FIG. 4 depicts the load difference.

Next, in the amount-of-correction determining step, a judgment is made on whether or not the load difference falls within a preset set range (also referred to as an allowable range). When the load difference exceeds the set range, it is determined that the bearing 3 should be corrected.

The set range is set at, for example, −30 to +30 percent of the average value of bearing loads on the bearings (a bearing on both sides of which cylinders are positioned or, specifically, bearings #2 to #7) 3 of the engine 2. For example, if the average value is 40 tons, the range is set to −12 to +12 tons. While a set range of −40 to +40 percent is permissible, a range of −30 to +30 percent is preferable. FIG. 4 shows that the bearing 3 exceeding the allowable range or, in other words, the bearing 3 whose load difference is −20 tons is the #7 bearing 3.

Figure 5:
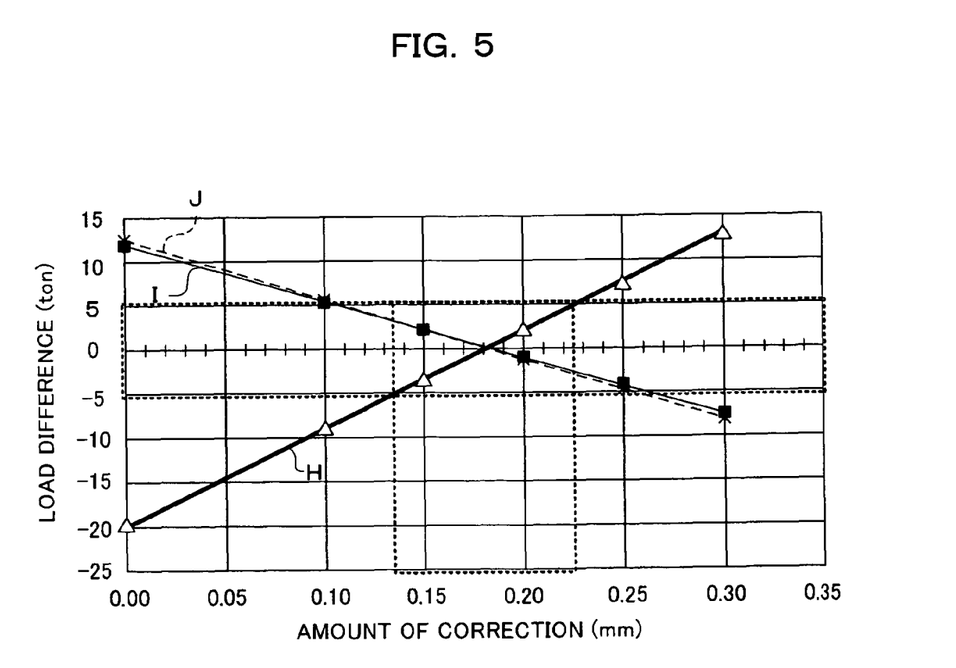
FIG. 5 is a graph showing a correction range of a bearing in the method of determining an amount of correction according to the embodiment of the present invention.

Then, with respect to the #7 bearing 3, a relationship between an amount of correction and a load difference can be determined by a computation formula (a formula for determining a load from a bearing height displacement using the spring constant of a bearing support portion) using the load difference of the #7 bearing 3 (−20 tons) as a starting point (in this case, obviously with an amount of correction of zero), as indicated by a solid line H shown in FIG. 5. Incidentally, the abscissa of a graph shown in FIG. 5 represents an amount of correction, and the maximum scale value of the abscissa indicates a correctable range.

From FIG. 5, a correction range is determined based on a preset load difference allowable range. In other words, an amount of correction is determined.

Here, the allowable range is set to −10 to +10 percent of the aforementioned bearing load average value. In other words, when the average value is 40 tons, the range is set to −4 to +4 tons. However, just to be on the safe side, the range is set to −5 to +5 tons (−12.5 to +12.5 percent). Moreover, while the allowable range may be set to −20 to +20 percent, the allowable range is preferably set to −15 to +15 percent, and more preferably set to −10 to +10 percent.

When determining the relationship represented by the graph shown in FIG. 5, first, for the #7 bearing 3, a load difference with respect to an amount of correction is determined by computation in the correctable range including the allowable range using the load difference (−20 tons) of the #7 bearing 3 as a starting point.

Moreover, the correctable range is set to 0.00 to 0.30 mm.

The correctable range can be determined by the following computation formula.

$$(\text{Amount of correction})_i = \left\{ \frac{\begin{array}{c} -(\text{Bearing load difference})_i + \\ (\text{Bearing load difference})_{i-1} + \\ (\text{Bearing load difference})_{i+1} \end{array}}{\left(\begin{array}{c} \text{Spring contant of bearing} \\ \text{support portion} \end{array}\right)_i} \right\} \times m \quad [\text{Formula 1}]$$

where $i$ denotes a bearing number and $m$ denotes a range setting constant (e.g., a constant ranging from 0 to 5)

In Formula (1), "m" is integer values of "0" and, for example, "1 to 5", and a straight line H representing a relationship between an amount of correction and a load difference is obtained from a result of analysis for each value of "m". Moreover, m=0 represents a case where correction is not performed.

In addition, as described earlier, the load difference allowable range is set to −5 to +5 tons, whereby as shown in FIG. 5, the correction range corresponding thereto is a range of approximately 0.14 to 0.22 mm.

Therefore, by determining the amount of correction so as to fall within the aforementioned range, the load difference at the #7 bearing 3 can be kept within a range of −20±5 tons. That is, by reducing a load difference between adjacent bearings or, in other words, by reducing variations in bearing loads acting on the bearings, a load acting on the bearing 3 can be set with a favorable balance. Furthermore, in other words, a friction force at a bearing can be reduced to cut down machine loss. Moreover, in FIG. 5, a solid line I denotes a load difference at the #6 bearing while a dashed line J denotes a load difference at the #8 bearing. It is also shown that the load differences at the #6 and #8 bearings 3 are also approximately in the allowable range.

As has been discussed, the amount-of-correction determination step can be described as being composed of: a set range excess bearing detecting step of detecting a bearing at which a load difference exceeds a set range; and a correction range determining step of determining a correction range such that the load difference at the bearing detected in the set range excess bearing detecting step falls within an allowable range.

Figure 6:
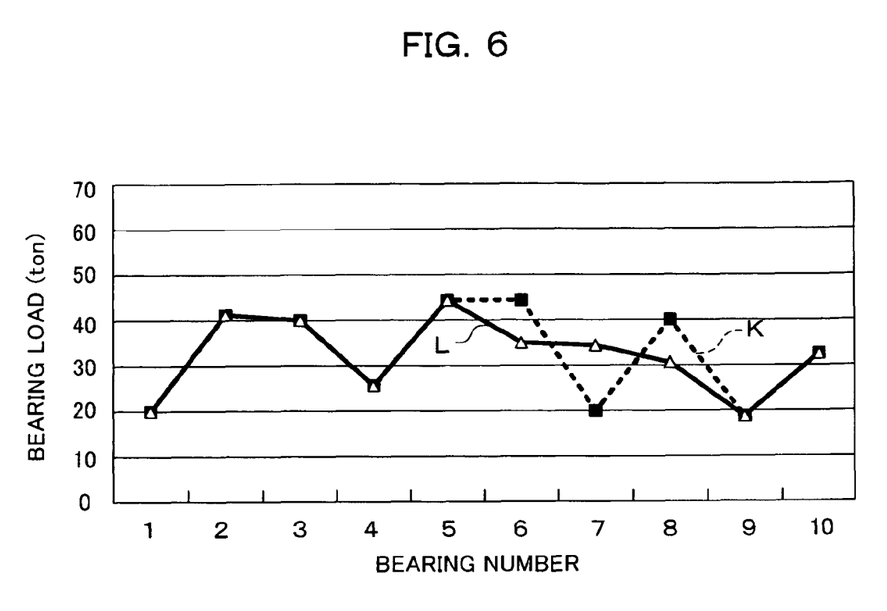
FIG. 6 is a graph showing computed bearing loads and corrected bearing loads in the method of determining an amount of correction according to the embodiment of the present invention.

In FIG. 6, a computed bearing load is indicated by a dashed line K and a bearing load after correction is indicated by a solid line L. FIG. 6 shows that, as a result of correction, a variation in bearing load or, in other words, a variation in load difference between adjacent bearings has been suppressed.

A transfer matrix method will be described.

In this transfer matrix method, when calculating displacements (referred to as a state quantity) of respective portions across the entire crankshaft, a field transfer matrix equation (whose coefficient is referred to as a field transfer matrix) is used for transferring displacement on a straight section such as a beam, and a point transfer matrix equation (whose coefficient is referred to as a point transfer matrix) is used for transferring displacement on a supporting portion (the changing point of a bearing portion or a changing point in an axial direction) which interrupts the continuity of the beam.

In the following description, the transfer matrix method is applied along the crankshaft. The direction along the crankshaft center (the shaft center of a journal) is used as a global coordinate system (expressed by x, y, and z and also referred to as an absolute coordinate system), while the direction along the crank arm and the crankpin is used as a local coordinate system (expressed by x', t, and r and also referred to as a relative coordinate system).

Figure 7:
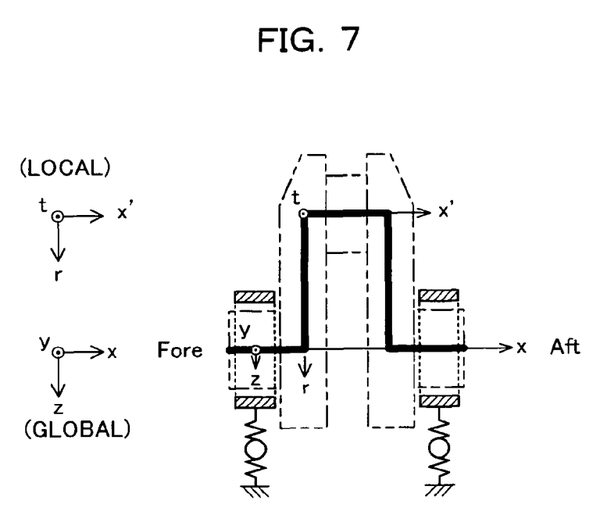
FIG. 7 is a schematic front view of a single crank throw of a crankshaft in the drive shafting according to the embodiment of the present invention.
Figure 8:
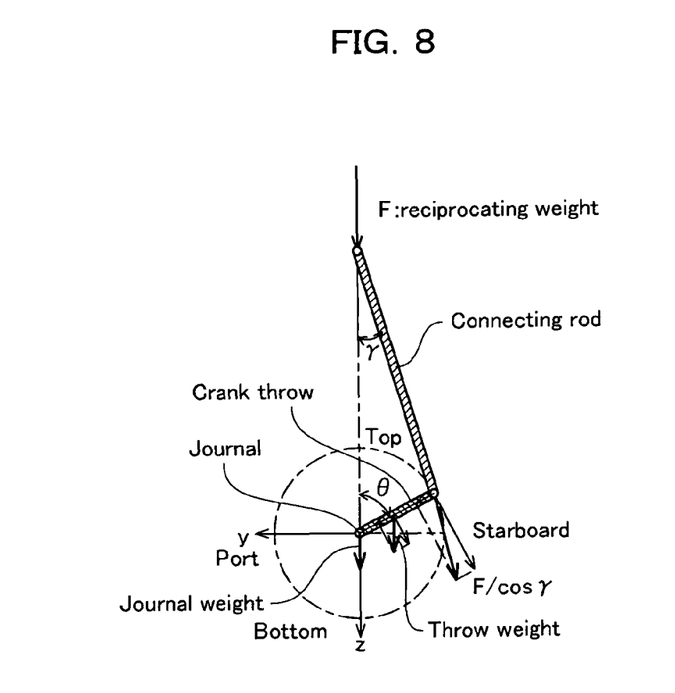
FIG. 8 is a schematic side view showing a local coordinate system of the crankshaft according to the embodiment of the present invention.

Moreover, FIG. 7 shows how global coordinate axes are set for a single crank throw, and FIG. 8 shows the decomposition of a force acting on the crank throw on the local coordinate system.

In the description below, the following reference characters shall be used unless noted otherwise.

a: initial length between crank arms
A: cross-sectional area
D: distance between crank arms
Def: crank deflection
E: modulus of longitudinal elasticity
F: shearing force
G: shear modulus
I: geometrical moment of inertia
J: polar moment of inertia of area
k: constant of spring at bearing portion
L: length
M: bending moment
T: torsional moment
θ: crank angle First, as represented by the formula below, an equation is created with a state quantity (displacement and acting force) B on the fore bearing portion being set as an unknown. In the formula below, S denotes a field transfer matrix, P denotes a point transfer matrix, R denotes a boundary matrix indicating a fore boundary condition, and R' denotes an aft boundary matrix. The respective matrices are all known.

$$R'S_{ns}P_{ns-1}S_{ns-1}\ldots P_1 S_1 RB = 0$$

The subscript ns in the formula given above indicates the number of sections obtained by dividing the shaft between fore and aft shaft ends by the bearing portions provided therebetween.

The fore state quantity B is calculated by solving the formula. The state quantity B is equivalent to a displacement vector q and a force vector Q which will be discussed later. Hereinafter, the field transfer matrix equation and the point transfer matrix equation are repeatedly applied with the state quantity serving as an initial value in order to calculate state quantities over the entire crankshaft.

That is, the displacement vector q and the force vector Q, which are state quantities in the global coordinate system, are represented by formulas (1) and (2) given below. Note that the vectors in the formulas are indicated in bold face type.

[Formula 2]

$$q = [d_x\ d_y\ d_z\ \phi_x\ \phi_y\ \phi_z]^T \quad (1)$$

$$Q = [T_x\ M_y\ M_z\ F_x\ F_y\ F_z]^T \quad (2)$$

In Formula (1), $d_x$, $d_y$, and $d_z$ denote displacement, distortion, or the like, and $\phi_x$, $\phi_y$, and $\phi_z$ denote an angle of twist, an angle of deflection, or the like. In Formula (2), $T_x$, $M_y$, and $M_z$ denote twisting moment, bending moment, or the like, and $F_x$, $F_y$, and $F_z$ denote an axial force, shearing force, or the like.

Furthermore, a displacement vector q' and a force vector Q', which are state quantities in the local coordinate system, are represented by Formulas (3) and (4) given below.

[Formula 3]

$$q' = [d_{x'}\ d_t\ d_r\ \phi_{x'}\ \phi_t\ \phi_r]^T \quad (3)$$

$$Q' = [T_{x'}\ M_t\ M_r\ F_{x'}\ F_t\ F_r]^T \quad (4)$$

Similarly, in Formula (3), $d_x$, $d_t$, and $d_r$ denote displacement, distortion, or the like, and $\phi_x$, $\phi_t$, and $\phi_r$ denote an angle of twist, an angle of deflection, or the like. In Formula (4), $T_{x'}$, $M_t$, and $M_r$ denote twisting moment, bending moment, or the like, and $F_{x'}$, $F_t$, and $F_r$ denote an axial force, shearing force, or the like.

Next, the field transfer matrix equation and the point transfer matrix equation that are used in the transfer matrix method will be described. The field transfer matrix equation for calculating a state quantity from the fore (indicated by a subscript "F") to the aft (indicated by a subscript "A") is represented by Formula (5) given below.

In Formula (5), i denotes a bearing number (a number of a shaft section obtained by division by the bearing portions).

[Formula 4]

$$\begin{bmatrix} q \\ Q \\ 1 \end{bmatrix}_i^A = \begin{bmatrix} f_1 & f_2 & q_0^A \\ 0 & f_1 & Q_0^A \\ 0 & 0 & 1 \end{bmatrix}_i \begin{bmatrix} q \\ Q \\ 1 \end{bmatrix}_i^F \quad (5)$$

where $$f_1 = \begin{bmatrix} 1 & 0 & 0 & 0 & 0 & 0 \\ 0 & 1 & 0 & 0 & 0 & L \\ 0 & 0 & 1 & 0 & -L & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix}$$

and $$f_2 = \begin{bmatrix} 0 & 0 & 0 & \frac{-L}{EA} & 0 & 0 \\ 0 & 0 & \frac{-L^2}{2EI_z} & 0 & \frac{L^3}{6EI_z} & 0 \\ 0 & \frac{L^2}{2EI_y} & 0 & 0 & 0 & \frac{L^3}{6EI_y} \\ \frac{-L}{GJ} & 0 & 0 & 0 & 0 & 0 \\ 0 & \frac{-L}{EI_y} & 0 & 0 & 0 & \frac{-L^2}{2EI_y} \\ 0 & 0 & \frac{-L}{EI_z} & 0 & \frac{L^2}{2EI_z} & 0 \end{bmatrix}$$

Next, a coordinate conversion formula (transfer equation) for converting a state quantity from the global coordinate system to the local coordinate system is represented by Formula (6) given below.

[Formula 5]

$$\begin{bmatrix} q' \\ Q' \\ 1 \end{bmatrix}_i = \begin{bmatrix} g_1 & 0 & 0 \\ 0 & g_1 & 0 \\ 0 & 0 & 1 \end{bmatrix} \begin{bmatrix} q \\ Q \\ 1 \end{bmatrix}_i \quad (6)$$

where $$g_1 = \begin{bmatrix} 1 & 0 & 0 & 0 & 0 & 0 \\ 0 & \cos\theta & -\sin\theta & 0 & 0 & 0 \\ 0 & \sin\theta & \cos\theta & 0 & 0 & 0 \\ 0 & 0 & 0 & 1 & 0 & 0 \\ 0 & 0 & 0 & 0 & \cos\theta & -\sin\theta \\ 0 & 0 & 0 & 0 & \sin\theta & \cos\theta \end{bmatrix}$$

Meanwhile, a coordinate conversion formula (transfer equation) for converting a state quantity from the local coordinate system to the global coordinate system is represented by Formula (7) given below.

[Formula 6]

$$\begin{bmatrix} q \\ Q \\ 1 \end{bmatrix}_j = \begin{bmatrix} g_2 & 0 & 0 \\ 0 & g_2 & 0 \\ 0 & 0 & 1 \end{bmatrix} \begin{bmatrix} q' \\ Q' \\ 1 \end{bmatrix}_j \quad (7)$$

where $$g_2 = \begin{bmatrix} 1 & 0 & 0 & 0 & 0 & 0 \\ 0 & \cos\theta & \sin\theta & 0 & 0 & 0 \\ 0 & -\sin\theta & \cos\theta & 0 & 0 & 0 \\ 0 & 0 & 0 & 1 & 0 & 0 \\ 0 & 0 & 0 & 0 & \cos\theta & \sin\theta \\ 0 & 0 & 0 & 0 & -\sin\theta & \cos\theta \end{bmatrix}$$

For example, a coordinate conversion formula (transfer equation) from the journal to the crank arm is represented by Formula (8) given below.

[Formula 7]

$$\begin{bmatrix} q' \\ Q' \\ 1 \end{bmatrix}_{arm} = \begin{bmatrix} g_3 & 0 & 0 \\ 0 & g_3 & 0 \\ 0 & 0 & 1 \end{bmatrix} \begin{bmatrix} q' \\ Q' \\ 1 \end{bmatrix}_{journal} \quad (8)$$

where $$g_3 = \begin{bmatrix} 0 & 0 & -1 & 0 & 0 & 0 \\ 0 & 1 & 0 & 0 & 0 & 0 \\ 1 & 0 & 0 & 0 & 0 & 0 \\ 0 & 0 & 0 & 0 & 0 & -1 \\ 0 & 0 & 0 & 0 & 1 & 0 \\ 0 & 0 & 0 & 1 & 0 & 0 \end{bmatrix}$$

Furthermore, Formula (8) given above is also used for coordinate conversion from the crank arm to the journal.

Moreover, a coordinate conversion formula (transfer equation) from the crankpin to the crank arm is represented by Formula (9) given below, and coordinate conversion from the crank arm to the crank pin is also expressed by the same Formula (9) given below.

[Formula 8]

$$\begin{bmatrix} q' \\ Q' \\ 1 \end{bmatrix}_{pin} = \begin{bmatrix} g_4 & 0 & 0 \\ 0 & g_4 & 0 \\ 0 & 0 & 1 \end{bmatrix} \begin{bmatrix} q' \\ Q' \\ 1 \end{bmatrix}_{arm} \quad (9)$$

where $$g_4 = \begin{bmatrix} 0 & 0 & 1 & 0 & 0 & 0 \\ 0 & 1 & 0 & 0 & 0 & 0 \\ -1 & 0 & 0 & 0 & 0 & 0 \\ 0 & 0 & 0 & 0 & 0 & 1 \\ 0 & 0 & 0 & 0 & 1 & 0 \\ 0 & 0 & 0 & -1 & 0 & 0 \end{bmatrix}$$

Meanwhile, the point transfer matrix equation at each of the bearing portions 3 is represented by Formula (10) given below.

[Formula 9]

$$\begin{bmatrix} q \\ Q \\ 1 \end{bmatrix}_{i+1}^{F} = \begin{bmatrix} 1 & 0 & 0 \\ h_1 & 1 & h_2 \\ 0 & 0 & 1 \end{bmatrix}_i \begin{bmatrix} q \\ Q \\ 1 \end{bmatrix}_i^{A} \quad (10)$$

where $$h_1 = \begin{bmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & -k_y & 0 & 0 & 0 & 0 \\ 0 & 0 & -k_z & 0 & 0 & 0 \end{bmatrix}$$

$$h_2 = \begin{bmatrix} 0 & 0 & 0 & 0 & k_y d_{y0} & k_z d_{z0} \end{bmatrix}^T$$

Moreover, temporary installation height data is to be substituted into $d_{z0}$ in $h_2$ (while $d_{y0}$ is constant), and new installation height data generated and changed by a genetic algorithm is inputted to $d_{z0}$ (while a suffix 0 (zero) of d denotes an initial value).

Next, a procedure for calculating a crank deflection will be described. Here, when $d_{x1}$, $d_{y1}$, and $d_{z1}$ denote displacement quantities at fore portions of the crank throw, $d_{x2}$, $d_{y2}$, and $d_{z2}$ denote displacement quantities at aft portions of the crank throw, and a denotes the initial length of the crank throw, then a distance D between adjacent crank throws is represented by Formula (11) given below (where a subscript 1 of d indicates a position (Sb) shown in FIG. 9 to be described later; and similarly, a subscript 2 indicates a position (Sh) shown in FIG. 9).

[Formula 10]

$$D = \sqrt{(a+d_{x2}-d_{x1})^2+(d_{y2}-d_{y1})^2+(d_{z2}-d_{z1})^2} \quad (11)$$

In addition, when $D_0$ denotes a distance on the top dead center (TDC, 0 degrees) of the piston and $D_{180}$ denotes a distance on the bottom dead center (BDC, 180 degrees) of the piston, then the crankshaft deflection (Def) is represented by Formula (12) given below.

[Formula 11]

$$Def = D_0 - D_{180} \quad (12)$$

Since a is in the order of $10^2$ mm and $d_x$, $d_y$, and $d_z$ are in the order of $10^{-3}$ mm, Formula (11) given above may be transformed into Formula (13) given below.

[Formula 12]

$$D - a = \frac{2a(d_{x2}-d_{x1})}{D+a} + \frac{(d_{x2}-d_{x1})^2 + (d_{y2}-d_{y1})^2 + (d_{z2}-d_{z1})^2}{D+a} \quad (13)$$

$$= d_{x2} - d_{x1}$$

where $$D + a = 2a$$

$$\frac{(d_{x2}-d_{x1})^2+(d_{y2}-d_{y1})^2+(d_{z2}-d_{z1})^2}{D+a} \ll d_{x2}-d_{x1}$$

Consequently, a crank deflection can be calculated by Formula (14) given below.

[Formula 13]

$$\text{Def} = (d_{x2} - d_{x1})_0 - (d_{x2} - d_{x1})_{180} \quad (14)$$

As is apparent from Formula (14), a crankshaft deflection is mostly dependent on an amount of deformation in a crankshaft center direction.

Figure 9:
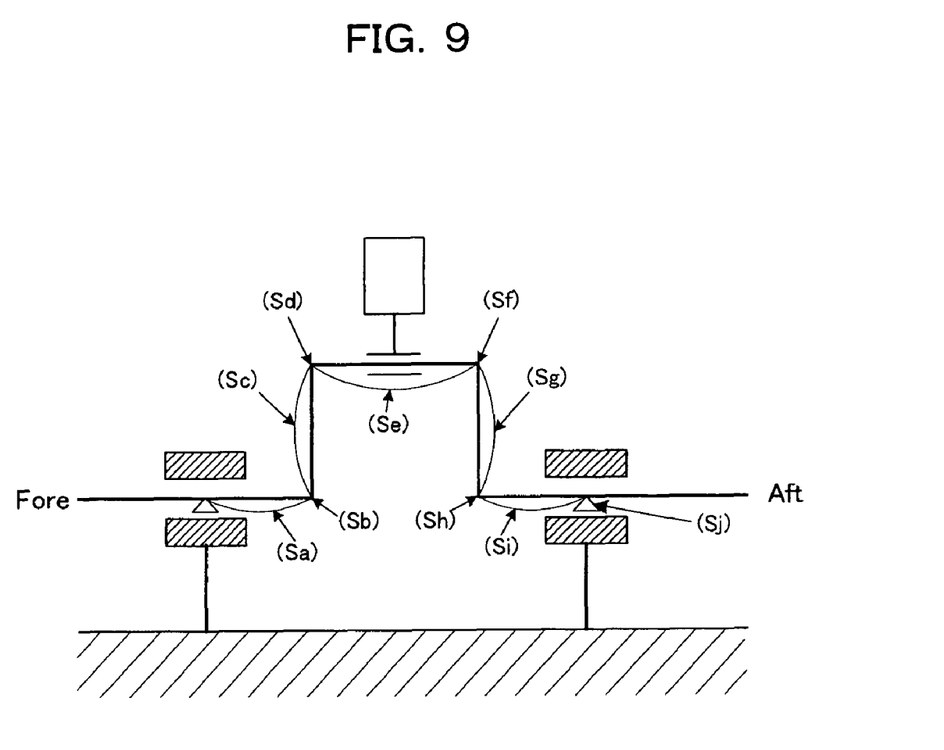
FIG. 9 is a schematic diagram explaining a computation procedure of a crank deflection of the crankshaft according to the embodiment of the present invention.

A specific procedure for calculating a crank deflection based on the formulas provided above will now be described with reference to FIG. 9. Here, while focusing on a single crank throw, calculating steps for respective members will be described in sequence.

Step a: The field transfer matrix equation represented by Formula (5) is used for a bearing portion at a portion (Sa).

Step b: At a bent portion (Sb), the left side of Formula (5) in Step a is substituted into the right side of the coordinate conversion formula represented by Formula (6), and the left side of Formula (6) at that point is substituted into the right side (journal) of the coordinate conversion formula represented by Formula (8).

Step c: At a portion (Sc), the left side of Formula (8) in Step b is substituted into the right side of Formula (5).

Step d: At a portion (Sd), the left side of Formula (5) in Step c is substituted into the right side of the coordinate conversion formula represented by Formula (9).

Step e: At a portion (Se), the left side of Formula (9) in Step d is substituted into the right side of Formula (5).

Step f: At a portion (Sf), the left side of Formula (5) in Step e is used as the left side of Formula (9).

Step g: At a portion (Sg), the right side $[q'Q'1]^T_{arm}$ of Formula (9) in Step f is substituted into Formula (5).

Step h: At a portion (Sh), the left side of Formula (5) in Step g is used as the left side of Formula (8), and the right side $[q'Q'1]^T_{journal}$ of Formula (8) at that point is substituted into the right side of the coordinate conversion formula represented by Formula (7).

Step i: At a portion (Si), the left side of Formula (7) in Step h is substituted into the right side of Formula (5). Furthermore, a transfer from a crank throw 1 to an adjacent crank throw 2 (a transfer in which a supporting point indicated by a portion (Sj) serves as a boundary) is performed, by using the point transfer matrix formula represented by Formula (10) and substituting the left side of Formula (5) in Step i into the right side of Formula (10).

As has been discussed, the respective displacements are calculated by transferring the state quantities q and Q (Q=0) from the fore side to the aft side using the respective transfer matrices which are the coefficients of the transfer formulas. As a matter of course, in the transfer process, Q also varies depending on $f_1$, $f_2$, $h_1$, and $h_2$ of Formula (5) and Formula (10).

As described above, after determining heights of bearings across an entire shafting based on an actually measured crank deflection and an actually measured bearing load on a predetermined bearing, at least a bearing load on each bearing disposed on the engine is determined by computation based on the bearing height, a load difference between the computed bearing load and a reference bearing load in an initially set state (also referred to as a comparison reference state) in which a crankshaft or the like is set on a bearing when the bearing height is on a reference plane (a horizontal plane whose height is zero), and, when the load difference exceeds a preset set range, the correction range of the bearing height is determined such that the load difference after changing the bearing height falls within a preset allowable range. Consequently, with respect to an engine installed in, for example, a ship, an amount of correction of a bearing height can be determined in an accurate and speedy manner regardless of whether the ship is newly built or already in service. In comparison to a normal method of correcting a bearing height in which an operator determines an amount of correction based on experience for bearings whose determined bearing heights exceed an allowable range, an amount of correction of a bearing height can be determined in an accurate and speedy manner.

In the aforementioned embodiment, the propulsion shafting made up of the intermediate shaft and the propeller shaft has been described as driven shafting. Different shafting such as shafting for rotating a pump is also applicable.

The invention claimed is:

1. A method of determining at least an amount of correction of a bearing height of a crankshaft in an engine connected to driven shafting, the method comprising:

a bearing height computing step of determining at least heights of bearings of the engine by using a transfer matrix method based on an actually measured bearing load on the bearing at a predetermined position and an actually measured crank deflection;

a bearing load computing step of determining at least a computed bearing load acting on each of the bearings of the engine based on the bearing height determined in the bearing height computing step;

a reference bearing load computing step of determining a reference bearing load acting on each bearing when the bearing height of each bearing of the engine is positioned on a reference plane;

a load difference computing step of determining a load difference between the computed bearing load and the reference bearing load on each bearing; and an amount-of-correction determining step of comparing the load difference determined in the load difference computing step with a set range and, when the determined load difference exceeds the set range, determining a correction range of the bearing height such that the load difference falls within an allowable range.

2. The method of determining an amount of correction of a bearing height according to claim 1, wherein the set range is set to −40 to +40 percent of an average value of loads on the bearings of the engine.

3. The method of determining an amount of correction of a bearing height according to claim 1, wherein the allowable range is set to −20 to +20 percent of an average value of loads on the bearings of the engine.

* * * * *